DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 9, 1973

915 O.G. 385

T915,007

METHOD FOR EFFECTING BACK SUBSTITUTION IN SPARSE MATRIX TECHNIQUES

Robert K. Brayton, Briarcliff Manor, and Fred G. Gustavson and Gary D. Hachtel, Ossining, N.Y., assignors to International Business Machines Corporation, Armonk, N.Y.

Filed Apr. 5, 1973, Ser. No. 348,385
Int. Cl. G06f *15/32*
U.S. Cl. 444—1
1 Sheet Drawing. 20 Pages Specification

A method is described which incorporates sparse matrix techniques for efficiently effecting the back substitution step in the solving of the linear system $$\frac{\partial f}{\partial x}(x, t)\Delta x = -f(x, t) \tag{1}$$

for various values of $t$, and for each $t$, for various values of $x$, the solving of such linear system usually being necessary in the solving of non-linear dynamic systems. The required steps in the solving of the linear system are $L/U$ (lower, upper) triangular factorization, forward elimination and the above-mentioned back substitution. Equation 1 may be restated as $$A(x,t)y = e_N = \text{col } (0, 0, \ldots, 1) \tag{2a}$$

where $$A = \begin{bmatrix} \left[\frac{\partial f}{\partial x}\right] & [f] \\ [0] & [1] \end{bmatrix}, \; y \doteq \begin{bmatrix} [\Delta x] \\ 1 \end{bmatrix} \tag{2b}$$

and utilizing 1–2–3 GNSO technique, the solving of Equations 2a and 2b implies the successive operations of factorization $$L_A/U_A = A(x,t) \tag{3}$$

and back substitution $$U_A y = e_N \tag{4}$$

The inventive method overcomes the problem which arises in the solution of Equation 4 in that there are required as outputs for each value of $x$ and $t$ only partial answers $$y_x = \theta_x * y \tag{5}$$

and $$y_t = \theta_t * y \tag{6}$$

wherein $\theta_x$ and $\theta_t$ are logical vectors and "*" represents scalar multiplication. The partial answers for the $y$ problem in back substitution is the ascertaining of the sparsest matrices UX and UT from which there may be obtained $y_x$ and $y_t$ utilizing the partial back substitutions $$y_x = \theta_x * (UX^{-1}e_N) \doteq \theta_x * \hat{y}_x \tag{7}$$

once for each $x$, and $$y_t = \theta_t * (UT^{-1}y_x) \doteq \theta_t * \hat{y}_t \tag{8}$$

once for each $t$, where UX and UT are submatrices of UA.

The inventive method performs the following functions:

(1) It identifies the "sparsest" partial output vectors $$\hat{y}_x \text{ and } \hat{y}_t$$

and the corresponding partial back substitution matrices UX and UT;

(2) It makes identification (1) solely from the process of Gauss elimination whereby the operation count for the partial back substitution is accounted for during the selection of pivots;

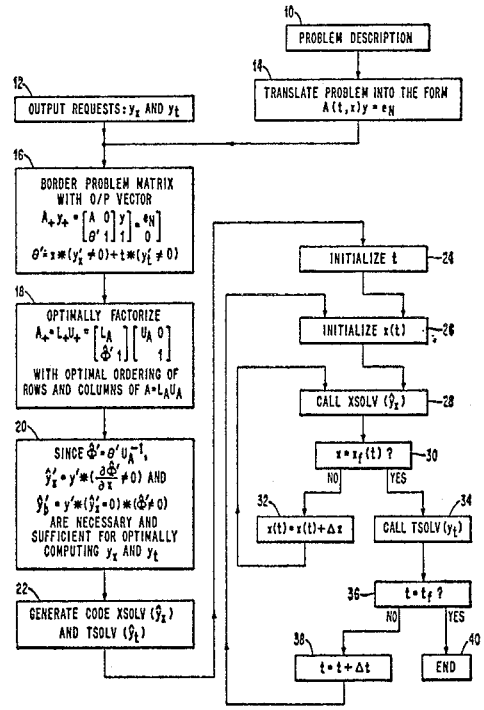

(3) It converts algorithms for minimizing $L/U$ factorization of matrices with $x$ and $t$ variability type into algorithms which minimize multiples for the combined operations of factorization and partial back substitution, i.e., it achieves steps (1)–(3);

(4) It achieves steps (1)–(3) in the case of more than two distinct variability types;

(5) It applies as written to cases where A is irreducible but achieves steps (1)–(3) with reducible matrices.

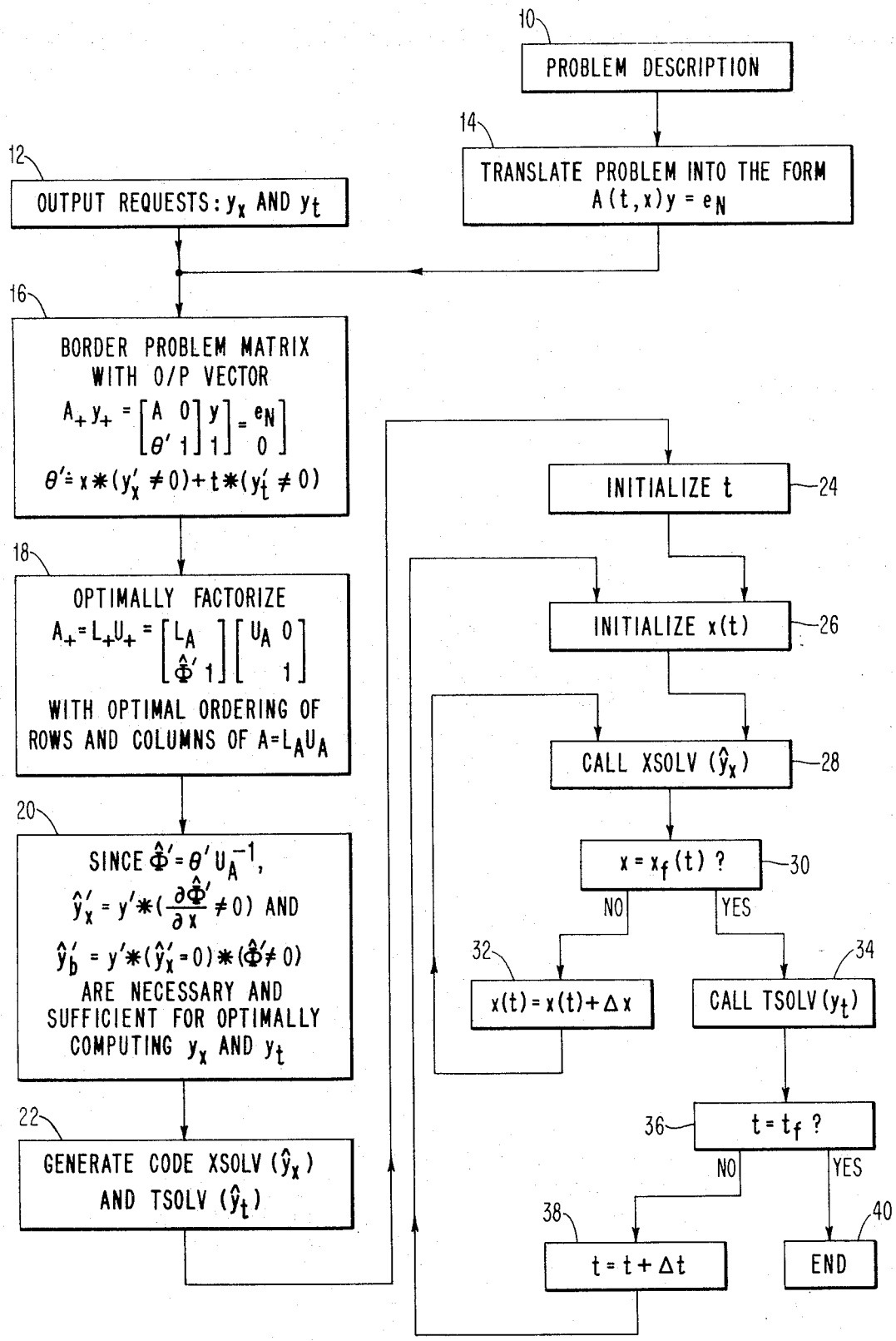

METHOD FOR EFFECTING BACK SUBSTITUTION
IN SPARSE MATRIX TECHNIQUES
Filed April 5, 1973